March 15, 1966  B. G. COPPING  3,239,991
METHOD OF WRAPPING PLASTIC FILM AROUND A PLURALITY
OF ASSEMBLED ARTICLES TO FORM A PACKAGE
Filed Oct. 5, 1962  3 Sheets-Sheet 1
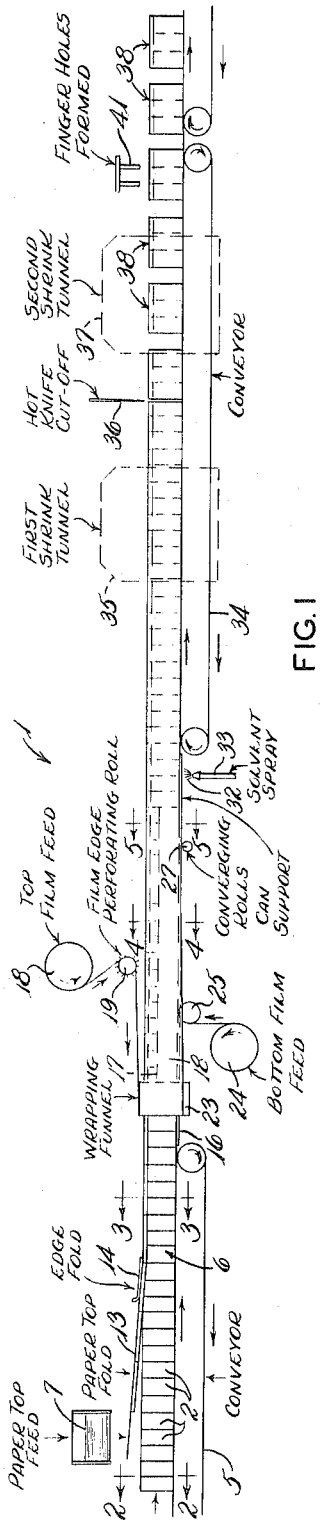
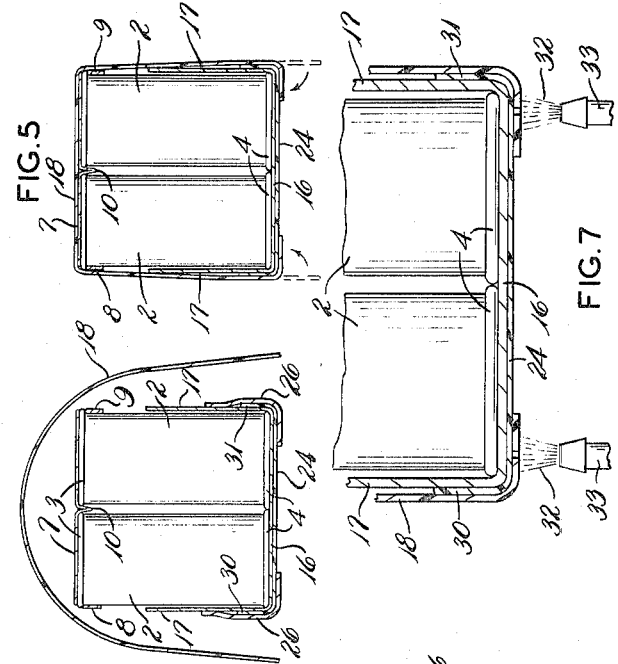
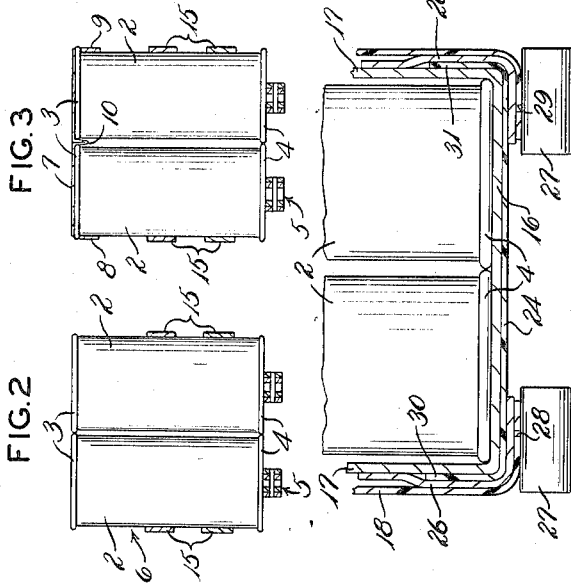
INVENTOR.
BRUCE G. COPPING
BY
ATTYS.

INVENTOR.
BRUCE G. COPPING
BY Oldham & Oldham
ATTYS.

March 15, 1966     B. G. COPPING     3,239,991
METHOD OF WRAPPING PLASTIC FILM AROUND A PLURALITY
OF ASSEMBLED ARTICLES TO FORM A PACKAGE
Filed Oct. 5, 1962     3 Sheets-Sheet 3

INVENTOR.
BRUCE G. COPPING
BY Oldham & Oldham
ATTYS.

United States Patent Office 3,239,991
Patented Mar. 15, 1966

3,239,991
METHOD OF WRAPPING PLASTIC FILM AROUND A PLURALITY OF ASSEMBLED ARTICLES TO FORM A PACKAGE
Bruce G. Copping, Akron, Ohio, assignor, by mesne assignments, to Geo. J. Meyer Manufacturing Co., Milwaukee, Wis., a corporation of Wisconsin
Filed Oct. 5, 1962, Ser. No. 228,612
9 Claims. (Cl. 53—30)

The present invention particularly relates to novel and improved methods of wrapping plastic films around a plurality of assembled articles for producing a package assembly therefrom.

At the present time, many articles, and particularly beverages, are sold in unitary packages where a plurality such as three, six or more cans or bottles of a beverage are sold as a packaged unit. Many thousands of such package assemblies are sold each day, and, because of the quantities of units involved, even small changes in the costs of the material in the package assemblies, and of the steps in the packaging methods required for enclosing the containers in the package assembly become very important. It is the general object of the present invention to provide a novel and improved method of wrapping plastic film around a plurality of assembled articles for automatically, continuously and rapidly forming large numbers of similar, attractively packaged, secure package assemblies.

Another object of the invention is to make enclosure means in a container package assembly from relatively low cost materials that can be automatically and inexpensively applied and secured around a given quantity of containers or articles to provide large quantities of individual package assemblies therefrom.

Another important object of the invention is to provide an encompassing band around a plurality of assembled articles, which band is made from a pair of plastic films, or strips, with one plastic film being on the bottom of the assembled articles or containers and with the other plastic film extending around the sides and top of the articles to provide an open ended encompassing band in tight sealed engagement with the articles to retain them in a packaged assembly.

Yet other objects of the invention are to provide a novel package assembly for a plurality of cylindrical articles, such as metal cans, where the bottom portion of the assembly can be especially reenforced by the use of thicker means, or additional layers of enclosure means in such portion of the package assembly than in other portions thereof; to provide a transparent plastic envelope for enclosing a plurality of articles therein whereby the contents of the articles when displayed for sale will be readily apparent in the completed package; to form an enclosure band or envelope around the group of abutted articles wherein such band is made from a pair of plastic films or strips overlapped at the lower lateral margins of the containers or articles where maximum abrasion and frictional forces are applied to the package assembly; to provide a novel and improved method of securing together a pair of overlapped plastic films having a plurality of perforations in the outer film by spraying a solvent for the plastic material onto the perforated portion of the plastic films to provide a bonding or sealing action therebetween; and to heat shrink a plastic film envelope about a plurality of assembled articles in a plurality of steps to obtain effective, tight engagement of an open ended band of plastic film with the packaged articles.

The foregoing and other objects and advantages of the invention will be made more apparent as the specification proceeds.

Attention now is particularly directed to the accompanying drawings, where:

FIG. 1 is a diagrammatic view of apparatus for practicing the novel method of the invention;

FIGS. 2, 3, 4 and 5 are fragmentary, enlarged vertical sections taken respectively on lines 2—2, 3—3, 4—4 and 5—5 of FIG. 1;

FIG. 6 is a fragmentary enlarged vertical section of the film converging roll and associated means of the apparatus of FIG. 1;

FIG. 7 is a fragmentary enlarged vertical section of the apparatus for spraying solvent against the overlapped plastic film strips to obtain a sealing action in the method of the invention;

When referring to corresponding members shown in the drawings and referred to in the specification, corresponding numerals are used to facilitate comparison therebetween.

Figure 8:
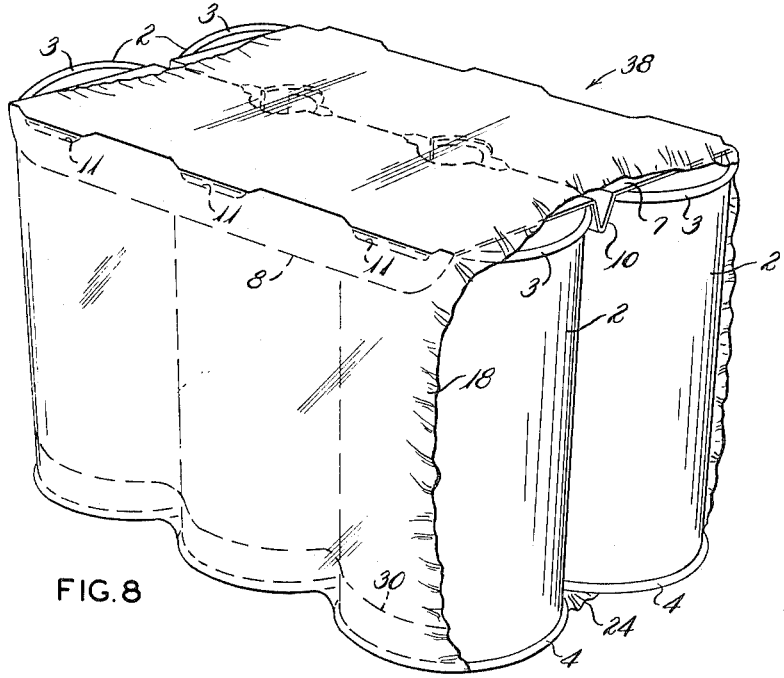
FIG. 8 is a perspective view of a package assembly, as partially formed by the invention, after passage through the first shrink tunnel and separation of the plastic film strips into envelopes encompassing a group of abutted articles.
Figure 9:
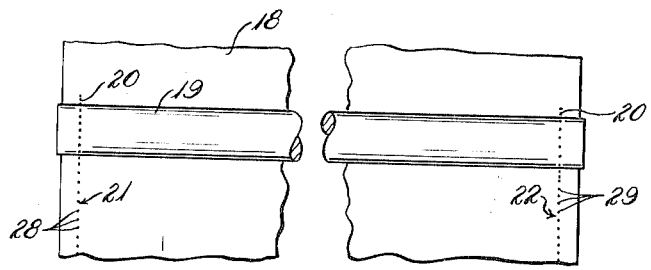
FIG. 9 is a fragmentary, broken away, enlarged plan view of the film edge perforating means used in the method of the invention.

The new method of the present invention, generally speaking as to one embodiment thereof, relates to a method of continuously forming a number of similar packages from a plurality of articles, such as cans, comprising the steps of moving a plurality of the articles along as a continuous stream, feeding a strip of plastic film to the lower surface of the articles and folding it up around the lower corners of the articles, feeding a second strip of plastic film to the tops of the articles and folding it over the sides and down over the lower corners of the articles to overlap the first plastic film strip, which second strip of plastic film may have perforations in the lateral margins thereof that overlap the first strip of plastic film, spraying a solvent for the plastic film thereagainst at the perforated portions thereof to seal the laminated plastic film strips together, heat shrinking the plastic film around the articles, cutting the plastic film strips between a pair of adjacent articles to separate several of the articles and the plastic film therearound into a package, and additionally heat shrinking the plastic film around the articles to secure the end portions of the plastic film against the articles and form a complete package therewith.

Reference is now particularly directed to the details of the structure shown in the accompanying drawings, and apparatus for practicing the process of the invention is indicated as a whole by the numeral 1. This apparatus 1 is for processing large numbers of containers, such as cylindrical metal cans 2 to as to provide a plurality of similar packages, or assemblies therefrom for convenient transport, storage and sale of the contents of these cans 2. The cans 2 are shown as having upper chines, or beads 3 that protrude laterally slightly from the can body, or cylindrical portion of the cans 2, and they also may have similar lower chines, or ribs 4 formed thereon. In the apparatus of the invention, a conveyor 5 is shown that has suitable quantities of the can 2 supplied thereto so as to provide a pair of rows 6 of the cans wherein the cans in the rows are longitudinally abutted, and where, initially the laterally spaced rows 6 of the cans may be in contact with each other.

Figure 11:
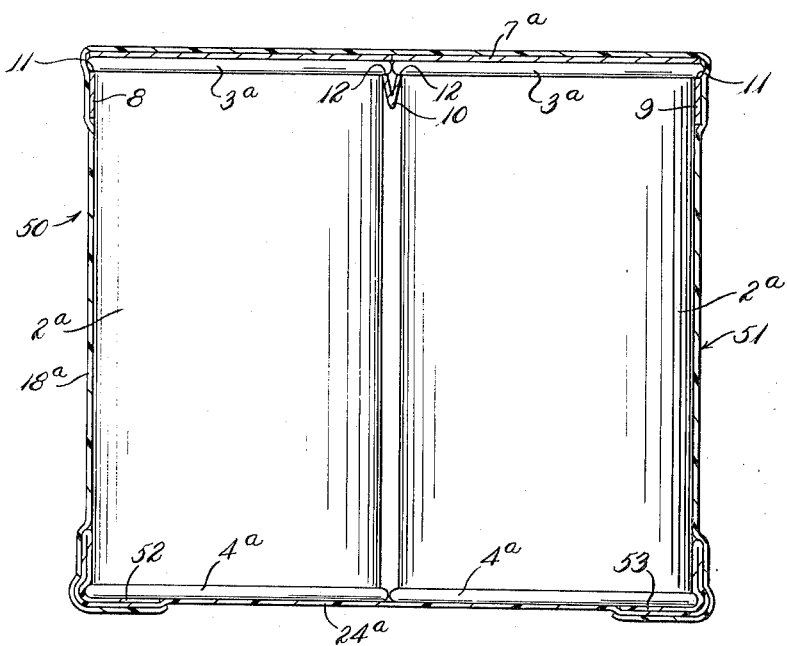
FIG. 11 is a vertical section taken through a modified assembly of the invention.

So as to facilitate the provision of individual packaged units, or assemblies from a plurality of the cans 2, a plurality of paper, or cardboard tops, or members 7 are provided at the first operative station in the apparatus 1. These tops 7 preferably are made in accordance with the disclosure in my copending U.S. patent application Serial No. 176,029, filed Feb. 27, 1962, now Patent No. 3,118,537. Initially these tops 7 are provided as flat sheets that have been suitably scored and cut as to provide, in the package unit to be provided in the apparatus 1, a pair of dependent edge flanges 8 and 9 at the lateral margins of the generally rectangularly shaped top 7. A substantially V-shaped center section 10 is also adapted to be provided in each of the tops 7 to extend longitudinally thereof. As best shown in FIG. 11, the edge flanges 8 and 9 have a plurality of longitudinally spaced slots 11 formed therein of a size and location to receive the top chine 3 of each can 2 individually therein, whereas a plurality of similarly shaped and likewise longitudinally spaced slots 12 are formed in the two walls of the center section 10 to receive the laterally inner portions of the upper chines 3 of the cans 2 of the package assembly, as shown.

FIG. 2 shows how the cans 2 can be positioned when moved along with the conveyor 5, as by suitable drive means connecting to the conveyor. The tops 7 can be suitably fed, either manually or automatically, to the rows of cans 2 in proper timed relationship to the movement of the cans so that one of the tops 7 is adapted to be placed over each group of six cans passing through the apparatus 1.

The apparatus 1 usually includes a paper top fold member 13 that is suitably positioned adjacent the tops of the cans 2 for forming the center section 10 in the tops 7 as the individual tops 7 move along under this member 13 and initially engaging the cans 2. Thereafter any suitable means or device 14 can engage the edge flanges 8 and 9 of the tops 7 to fold and press them down into engagement with the lateral margins and top chines of a group of the assembled cans 2 in the rows 6 in which the cans are grouped. Guide members 15 ars provided in association with the conveyor 5 to retain the cans 2 in desired relationships with each other and from the rows 6 of the cans. These guides 15 are positioned farther apart as the conveyor 5 moves downstream of the apparatus 1 at the edge fold device 14 to enable the center sections 10 of the tops 7 to be forced intermediate the rows of cans to provide the relationship shown in FIG. 3 of the drawings.

*Article wrapping action*

From the conveyor 5, the cans 2 move onto a support plate 16 that extends longitudinally of the apparatus and which plate has lateral guides 17 provided thereon. The articles, or cans 2 can be forced longitudinally along the support plate 16 by the initial drive of the conveyor 5 and the abutted relationship between the rows of cans 2, or other means (not shown) such as a drive disc or other member can be provided to engage the lateral margins of the cans 2 for moving them longitudinally of the support plates 16 at the desired speed in abutted relationship with the adjacent cans.

A roll of suitable plastic film 18 is journaled above other portions of the apparatus 1 to be pulled from the carrier spool therefor and to pass over a control or perforating shaft, or roll 19 that has a plurality of perfortaing pins 20 provided at the lateral margins of the perforating roll 19 so that, as the plastic film, or a strip of the plastic film 18 is led over the perforating roll 19, a plurality of longitudinally aligned perforations 21 and 22 are provided in the lateral margins of the strip of plastic film for a purpose to be hereinafter described in more detail. From the perforating roll 19, the plastic film 18 is led to a wrapping funnel 23 and is doubled back to be drawn thereunder and move in the same direction as the cans 2 in passing along the apparatus 1. This plastic funnel naturally starts to shape the plastic film to desired contour as soon as it has left the perforating roll 19 and this film, when drawn back in under the wrapping funnel 23, has the approximate shape as shown in FIG. 4.

A second strip of plastic film 24 is shown on a roll journaled below the support plate 16. Such plastic film 24 is led up over a guide roll 25 positioned immediately below the support plate 16. This plastic film 24 is next led between guides 26 at the connection between the support plates 16 and the side guides 17 formed thereon, or positioned thereadjacent, to be shaped or folded up around the side portions and the lower edges of these guides 17, whereby the plastic film 24 is of substantially U-shape in section at the portion of the apparatus, as indicated in FIG. 4.

The engagement of the plastic film 18 with the group of articles or cans 2 moving along the support plates 16 is completed by members, such as a pair of correlated tracking brushes, or rolls 27. These rolls 27 are suitably controlled as a unit and engage the lower lateral margins of the plastic film 18 to move the plastic film 18 to the left, or right as required to center the film about the articles to be packaged. Other means, or rolls (not shown) may be provided downstream of the rolls 27 to aid in drawing the film 18 snugly against the articles and down against the lower surface of the guides 26. Further downstream, the guides 26 terminate, and the plastic film 18 at the lower lateral margins thereof overlap the marginal portions of the plastic film 24, as indicated best in FIG. 7 of the drawings. The rolls 27 are controlled as to their positions by a sensing means, such as a microswitch, that is positioned at one lateral margin of the film 18 adjacent the rolls.

*Plastic film sealing*

A further important feature of the present invention is that the overlapped sections of the plastic film include apertured or perforated marginal portions 28 and 29 of the plastic film 18 that overlap upwardly folded marginal portions 30 and 31 of the plastic film 24 and are in juxtaposition by the action of the rolls 27 and associated means. I have discovered that it is possible to spray a solvent material 32 from a nozzle 33 in a suitable carrier air stream against these apertured marginal portions 28 and 29 of the plastic film 18 and have a substantially instantaneous sealing action obtained between the adjacent overlapped areas of these plastic films. It appears that small quantities of the solvent pass through the apertures or perforations 21 and 22 provided in the outer film strip to produce an effective, rapid bonding between the adjacent plastic films 18 and 24. It will be noted that the air stream itself issuing from the nozzle 33 aids in retaining these overlapped portions of the plastic film strips in contact with each other so that the desired bonding action is obtained promptly at room temperature as these cans 2 and the plastic films 18 and 24 move longitudinally in the apparatus at a common speed. The solvent appears to provide very rapid bonding action. Any reasonable number and size of perforations seems to provide good bonding action between the adjacent portions of the overlapped sheets. From the sealing station or portion of the apparatus 1, the cans 2 and plastic films 18 and 24, now assembled as the general type of a unit shown in FIG. 7 where the plastic forms an enclosure extending around the cans and top 7, can be slid off of the support plate 17 and moved onto a support conveyor 34 for moving them through the remainder of the apparatus. This conveyor 34 is driven by any desired means to maintain the predetermined rate of movement of the cans in the apparatus. Any suitable guide means can be provided in association with this conveyor 34 to aid in retaining the cans and plastic film units in desired positions thereon.

*Heat shrink action*

Inasmuch as the plastic films 18 and 24 are preselected and produced so as to have heat shrink properties in a transverse direction to the strips of the film moving into and through the apparatus, the assembly of the cans and plastic films is then led through a suitable heat shrink tunnel 35. This tunnel or member 35 is of substantially conventional construction and sufficient heat is supplied to the assembly of the cans 2 and plastic films 18 and 24 while the units being formed therefrom are within the tunnel 35 to provide the desired heat shrink action on the plastic film and obtain a shrinkage of the plastic films 18 and 24 down onto the tops 7. This action draws such tops tightly down against the cans 2 to secure the slots in the edge flanges 8 and 9 and the cans in engagement and generally to secure the assembly of the six cans into an integral unit contained in a continuous tube.

Figure 10:
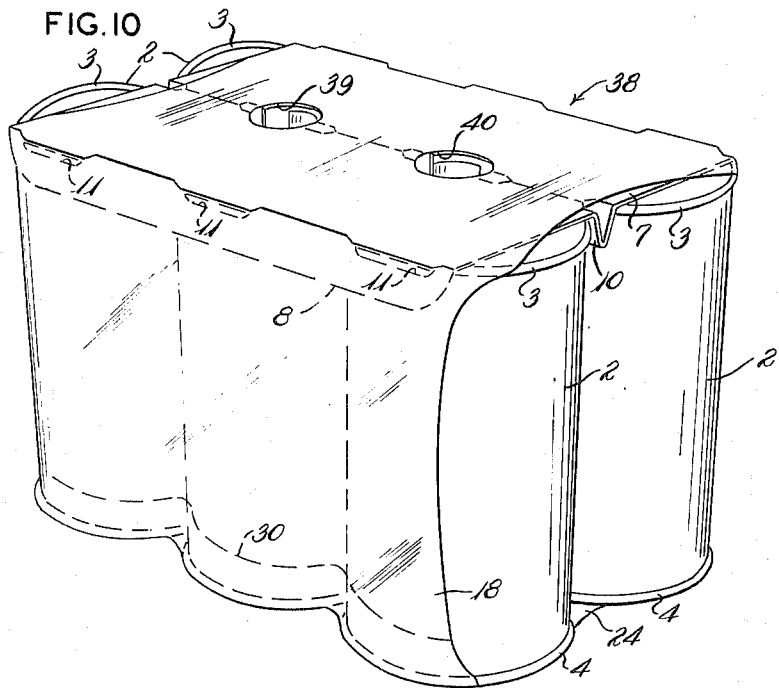
FIG. 10 is a perspective view of a completed package assembly formed by the method of the invention.

After the conveyor 34 has moved the cans through the heat shrink tunnel 35, then any suitable member such as a hot knife, or cut-off means 36 is operatively associated with the remainder of the apparatus of the invention. This cut-off means, or knife 36 is positioned by any conventional means for rapid vertical movement, or for vertical movement when moving longitudinally with the conveyor 34 so as to cut sections from the tube formed from the plastic films 18 and 24. Naturally these sections cut from these strips of plastic films are of a length as to cover a unit of the cans 2 to be provided as a packaged article, and in this instance, six of the cans passing through the apparatus. These groups of six cans, while still on the conveyor 34, but with the plastic strips being cut into sections associated with an individual can unit, then preferably move into a second heat shrink tunnel 37 which is of substantially conventional construction and in which sufficient heat is applied to the package assembly as to cause the ends of the plastic envelope, or band extending around the groups of cans to be pulled into tight bonded engagement with the ends and sides of the cans 2 during their passage through this tunnel 37, in order to provide the finished package unit, as shown in FIG. 10.

It will be seen that the plastic film end portions, as indicated in FIG. 8, are relatively loosely associated with the end and marginal portions of the end cans in the package assembly. By the additional heat shrink operation, I am able to provide a snug, permanent engagement of the plastic band formed from the sections, or sheets of the plastic films 18 and 24 with the ends and marginal portions of the package unit.

The package unit of the invention so produced is indicated as a whole by the numeral 38, and this assembly is completed, and transportation thereof is facilitated, by the provision of a pair of finger holes 39 and 40 that are formed in the upper portion of the plastic band extending around the groups of cans, or other articles. The finger holes may be reenforced by portions of the top 7 and are formed by a suitable member, such as a cutter or punch device 41 operatively associated with the conveyor 34, after the cans or groups of articles have passed through the second heat shrink tunnel 37.

By the process of the invention, it is seen that at least two thicknesses of the plastic films 18 and 24 are provided at the lower lateral margins, or at chines 4 of the cans 2 in this package assembly 38. Hence, even if a relatively thin plastic film is used in forming these plastic films 18 and 24, by doubling their thicknesses at the lower portion of the containers or articles 2, a greatly strengthened package assembly 38 is produced as the major portion of the stresses applied to these articles and their enclosure means in transport, storage and use of the units occurs at these lower chines 4 of the cans 2.

*Modified package and method*

FIG. 11 of the drawings shows a slight modification of the package assembly previously described and wherein a package assembly 50 is formed. In this instance, an open end plastic enclosure, or band 51 is provided that extends transversely around the group of cans or other articles 2a and again holds a top 7a in tight engagement with the upper portions or tops of the cans 2a and the top chines 3a formed thereon in the same manner as in the assembly previously described. However, in this package assembly, it is an important feature that the plastic film 24a, for example, prior to being shaped into substantially U-shaped form to engage the bottom portions of the cans 2a, as guided therearound through the guide plate means in the apparatus, in association with the support plate means for the cans, is folded inwardly at its lateral margins 52 and 53 upon itself to provide a double thickness of the bottom sheet at this portion extending around the lower chines 4a of the assembled cans. This laterally inner folding action of the sheet or film 18a is applied thereto in the same manner, as outlined hereinbefore, to form the package assembly 50 shown in FIG. 11. In this package assembly, triple thicknesses of the plastic films are provided at these lower chines 4a of the cans and again further strengthens the package assembly in this important stress area.

In use of the process of the invention, these plastic films can be of any suitable thickness, and it has been found that plastic films as thin as about .00075 inch in thickness can be used both for the film 18 and the film 24, especially when the construction shown in FIG. 11 is provided. Such quite thin plastic film still gives an extremely sturdy, satisfactory package action for transport, carrying and use of the packaged item.

It should be realized that any desired type of perforations can be provided in the marginal portions of the plastic film or sheet to be the outermost member in the package assembly. Hence, should the plastic film 18, for example, be folded in around the lower chines 4 prior to folding the marginal portions of the plastic film 24 therearound, then obviously the lateral margins of the plastic film 24 would have suitable perforations provided therein, and if desired, the marginal portions of the plastic film or strip 18 could be folded inwardly upon themselves prior to their shaping around the lower chines 4 of the cans 2 or other articles with which the plastic film is to be assembled. Obviously, these overlapped areas in the plastic films can be of any desired lengths, but preferably the overlapped sections only need to be long enough to extend around these chines for a short distance such as a half an inch to an inch in each direction and reenforce this lower corner unit of the package.

In referring to the types of plastic material used in forming the films of the invention, it should be realized that any satisfactory substantially transparent heat shrink type of a plastic film can be used. Films suitable for use in the process of the invention can be made from, for example, polyethylene, polyolefin, or polyvinyl chloride. The plastic film has been so processed in the production thereof that it has heat shrink properties primarily in only one direction, that is, the direction extending transversely around the open end plastic band formed in the plastic assemblies 38 and 50 made in accordance with the present invention. Such type of molecularly oriented film is particularly suited for use in the second heat shrink step to seal the film band tightly around the articles without any excessive longitudinal shrink action at that time. For example, the film band may have about three times as much cross shrink as it has machine direction, or longitudinal shrink.

From the foregoing, it will be seen that a novel and improved method of producing a package assembly has been provided. In this package assembly, preferably some type of tops 7 are used to aid in forming a top carrier member in the finished assembly. However, in some instances, the tops 7 may not be used, especially if a stronger plastic film is used, or if the articles packaged are easily carried as a unit. The general packaging method of the present invention hence can be practiced regardless of whether or not such tops 7 are initially applied to units of the articles to be packaged.

It will be realized that the open ended bands of plastic formed by the two strips of plastic film or sheet by the process of the invention can have the overlapped areas thereof secured together in any suitable manner, such as by heat sealing, including the use of ultrasonics, or by adhesives or cements, but that the spraying of a solvent thereagainst at the apertured portion in the outer sheet is one excellent, inexpensive, and positive method that has been devised to form the package assembly of the invention by the novel method disclosed herein. The method of the invention can be continuously practiced in the manner described. Or, sheets of plastic film could be cut to size to produce open end bands extending around a group of articles in one direction. The edges of the sheets would be overlapped and secured together for heat shrink action in the manner described hereinbefore.

In view of the foregoing, it is believed that the objects and advantages of the invention have been achieved by the provision of a novel, rapid, inexpensive and automatic packaging method and means for continuously sealing a pair of plastic films or strips around groups of assembled articles to form attractive, sturdy packages therefrom.

While two complete embodiments of the invention have been disclosed herein, it will be appreciated that modification of these particular embodiments of the invention may be resorted to without departing from the scope of the invention as defined in the appended claims.

What I claim is:

1. A method of continuously forming packages from a plurality of articles, such as cans having top chines thereon comprising the steps of moving a plurality of articles along as a pair of continuous laterally abutted streams, applying top units to a selected number of the abutted articles to separate them into packageable groups, said top units having dependent sections thereon with spaced slots therein for receiving the top chines of the articles therein, engaging said slots with said top chines, feeding a strip of plastic film to the lower surface of the articles and folding it up around the lower corners of the articles, feeding a second strip of plastic film to the tops of the articles and folding it over the top units and sides and lower corners of the articles to overlap said first plastic film strip, said second strip of plastic film having perforations in the lateral margins thereof that overlap said first strip of plastic film, spraying a solvent for the plastic thereagainst at the perforated portions thereof to seal the laminated plastic films together, heat shrinking the plastic film around the articles and top units to aid in retaining said top chines and slots of said sections in engagement, cutting the combined plastic strips between adjacent top units to separate the articles and plastic film strips into a package, and additionally heat shrinking the plastic film around the articles and top units to secure the end portions of the plastic film against the articles and form a complete package therewith.

2. A method of continuously forming packages from a plurality of articles, such as cans having top chines thereon comprising the steps of moving a plurality of articles along as a pair of continuous laterally abutted streams, applying top units to several of the abutted articles to separate them into packageable groups, said top units having dependent sections thereon with spaced slots therein for receiving the top chines of the articles therein, engaging said slots with said top chines, feeding a strip of plastic film to one surface of the articles and folding it around the lower corners of the articles, feeding a second strip of plastic film to an opposed surface of the articles and folding it over the lower corners of the articles to overlap said first plastic film strip, said second strip of plastic film having perforations in the lateral margins thereof that overlap said first strip of plastic film, spraying a solvent for the plastic thereagainst at the perforated portions thereof to seal the laminated plastic films together extending around the groups of articles in one direction, heat shrinking the plastic film around the articles and top units to aid in retaining said top chines and slots of said sections in engagement, cutting the combined plastic strips between adjacent top units and groups of articles to separate the articles and plastic film strips into a package, and additionally heat shrinking the plastic film around the articles and top units to secure the end portions of the plastic film against the articles and form a complete package therewith.

3. A method of forming packages from a plurality of articles such as cans comprising the steps of providing a plurality of abutted articles, feeding a strip of plastic film to a surface of the articles and folding it around the lower corners of the articles, feeding a second strip of plastic film to another surface of the articles and folding it over the lower corners of the articles to overlap said first plastic film strip and provide a band extending around the articles in one direction, said second strip of plastic film having perforations in the lateral margins thereof that overlap said first strip of plastic film, spraying a solvent for the plastic thereagainst at the perforated portions of said second plastic film strip to seal the laminated plastic film strips together, heating the entire plastic film to shrink it around the articles, and cutting the heat shrunk plastic from the plastic film strips to separate the articles and plastic film into a package.

4. That method of securing plastic film around a plurality of articles such as cylindrical metal cans comprising the steps of forming a group of abutted articles in a longitudinally extending row, providing a pair of plastic film strips of a combined width to encompass said articles in said row as a band extending transversely therearound, perforating one plastic film adjacent the lateral margins thereof to form continuous rows of spaced perforations therein, wrapping the plastic film strips around the group of articles to form a single layer of plastic film therearound with two overlapped longitudinally extending plastic film areas being formed and with the apertured layer of film being the outer layer and with the apertures being in the overlapped areas of the film, spraying a solvent onto the plastic film at the apertured areas thereof to seal the film strips together, heat shrinking the plastic film about the articles, and cutting sections of the plastic film from the strips to form a package with the articles.

5. That method of securing plastic film around a plurality of articles, such as cylindrical metal cans, comprising the steps of forming a group of abutted articles, providing a pair of plastic film strips of a combined width to encompass said articles, wrapping the plastic film strips around the group of articles to form a layer of plastic therearound with two overlapped longitudinally extending plastic sheet areas being formed at the lower lateral margins of the articles, folding the marginal portions of one of said plastic film strips laterally inwardly over the adjacent portions of the strip and applying such folded portions to the lower corners of the articles before overlapping said one plastic film strip with the second plastic film strip, securing the plastic film strips together at the overlapped areas thereof to form an open ended band extending around said articles, heating the entire plastic band to start to shrink it about the articles with the folded portions of the one strip lying against and extending over the lower corners of the articles, cutting the plastic band from the plastic film strips to form a package with the articles, and further heating the entire plastic band to shrink into tight engagement with the articles.

6. That method of securing plastic film around a plurality of articles, such as cylindrical metal cans, comprising the steps of forming a group of abutted articles, providing a pair of plastic film strips of a combined width to encompass said articles, folding the marginal portions of one of said plastic film strips laterally inwardly over the adjacent portions of the strip and applying such folded portions to the articles at the lower corner portions thereof, wrapping the second plastic film strip around the group of articles to form a layer of plastic therearound with said first plastic film strip and to provide two overlapped longitudinally extending plastic sheet areas of said plastic film strips at the lower lateral corners of the articles, securing said plastic film strips together at the overlapped areas thereof to form an open ended band extending around said articles, which band is reenforced in the portions thereof engaging the lower corners of said articles, and heat shrinking the plastic band about the articles.

7. That method of securing plastic film around a plurality of articles, such as cylindrical metal cans, comprising the steps of forming a group of two longitudinally extending rows of abutted articles, placing at top member over the group of articles with a dependent portion positioned therebetween, providing a pair of plastic film strips of a combined width to encompass said articles, wrapping the plastic film strips around the group of articles to form a layer of plastic therearound with two overlapped longitudinally extending plastic sheet areas being formed at the lower lateral margins of the articles, folding the marginal portions of one of said plastic film strips laterally inwardly over the adjacent portions of the strip and applying such folded portions to the articles before overlapping said one plastic film strip with the second plastic film strip, securing the plastic film strips together at the overlapped areas thereof to form an open ended band extending around said articles, the plastic film in said band being heat shrinkable particularly in the direction extending transversely of said band, heat shrinking the plastic band about the articles to secure a section of the plastic band around a group of articles and to retain said top member in position, cutting the plastic band from the plastic film strips to form a package with the articles, and further heat shrinking the plastic band about the articles and top member to secure end portions of the plastic band tightly against the group of articles and to secure the articles together in abutted relation.

8. A method of continuously forming packages from a plurality of articles such as cans comprising the steps of moving a plurality of articles along as a continuous stream on a support means having a bottom and side portions for receiving and guiding the stream of articles, feeding a strip of plastic film to the lower surface of the support means and folding it up around and adjacent the lower corners of the articles, feeding a second strip of plastic film to the tops of the articles and folding it over the sides and lower corners of the articles and of the support means to overlap said first plastic film strip, the outer of said plastic films being perforated in the laminated portions thereof, securing the laminated plastic film strips together by spraying a liquid against the perforated portions of the outer plastic film, removing the articles with the plastic film therearound from the support means, heat shrinking the plastic film around the articles, cutting the plastic film strips between a pair of adjacent articles to separate several of the articles and the plastic film therearound into a package, and additionally heat shrinking the plastic film around the articles to secure the end portions of the plastic film against the articles and form a complete package therewith.

9. A method of continuously forming packages from a plurality of articles, such as cans having top chines thereon comprising the steps of moving a plurality of articles along as a pair of continuous laterally abutted streams, applying top units to several of the adjacent abutted articles in both streams to separate them into packageable groups, said top units having dependent sections therein positioned between the rows of articles, feeding a strip of plastic film to one surface of the articles and folding it around the lower corners of the articles, feeding a second strip of plastic film to an opposed surface of the articles and folding it over the lower corners of the articles to overlap said first plastic film strip at the lower corners of the articles, securing the laminated plastic films together to extend around the groups of articles in one direction, heat shrinking the plastic film around the articles and top units to aid in retaining the articles abutted and to engage the articles in a group with said dependent section, cutting the plastic strips between adjacent top units and groups of articles to separate the articles and plastic film strips into a package, additionally heat shrinking the plastic film around the articles and top units to secure the plastic film against the articles and top unit to form a complete package therewith, and cutting finger receiving holes in the plastic film at selected areas thereof over finger receiving portions of a said top unit.

References Cited by the Examiner

UNITED STATES PATENTS

| | | | |
|---|---|---|---|
| 2,210,509 | 8/1940 | Strauch | 53—30 X |
| 2,549,122 | 4/1951 | Osterhof | 53—33 X |
| 2,980,245 | 4/1961 | Stoker | 53—28 X |
| 3,034,271 | 5/1962 | Carpenter et al. | 53—379 X |
| 3,087,610 | 4/1963 | Kirkpatrick. | |
| 3,111,221 | 11/1963 | Chapman et al. | |

FRANK E. BAILEY, *Primary Examiner.*

TRAVIS S. McGEHEE, *Examiner.*